US011489413B2

United States Patent
Murooka et al.

(10) Patent No.: US 11,489,413 B2
(45) Date of Patent: Nov. 1, 2022

(54) ROTATING ELECTRIC MACHINE, TEMPERATURE DETECTOR THEREOF, AND MANUFACTURING METHOD AND PROTECTION METHOD THEREOF

(71) Applicant: DENSO CORPORATION, Kariya (JP)

(72) Inventors: Takaharu Murooka, Kariya (JP); Masataka Yoshimura, Kariya (JP)

(73) Assignee: DENSO CORPORATION, Kariya (JP)

(*) Notice: Subject to any disclaimer, the term of this patent is extended or adjusted under 35 U.S.C. 154(b) by 309 days.

(21) Appl. No.: 16/800,218

(22) Filed: Feb. 25, 2020

(65) Prior Publication Data
US 2020/0274422 A1  Aug. 27, 2020

(30) Foreign Application Priority Data
Feb. 27, 2019 (JP) .............................. JP2019-034670

(51) Int. Cl.
| | | |
|---|---|---|
| H02K 11/25 | (2016.01) | |
| H02K 3/50 | (2006.01) | |
| G01K 13/00 | (2021.01) | |
| G01K 3/00 | (2006.01) | |

(Continued)

(52) U.S. Cl.
CPC ............. *H02K 11/25* (2016.01); *G01K 3/005* (2013.01); *G01K 7/22* (2013.01); *G01K 13/00* (2013.01); *H02K 3/50* (2013.01); *H01C 7/008* (2013.01); *H02K 2203/06* (2013.01)

(58) Field of Classification Search
CPC ...... H02K 11/25; H02K 3/50; H02K 2203/06; H02K 3/28; H02K 5/02; H02K 15/00; H02K 2213/03; G01K 3/005; G01K 7/22; G01K 13/00; G01K 1/14; H01C 7/008; H02P 29/60; H02P 29/64; H02P 29/40; H02P 29/66

See application file for complete search history.

(56) References Cited

U.S. PATENT DOCUMENTS

| | | | |
|---|---|---|---|
| 6,181,044 B1 | 1/2001 | Umeda et al. | |
| 2011/0064909 A1* | 3/2011 | Alderson | .......... C08J 5/24 442/305 |
| 2013/0270973 A1* | 10/2013 | Ikemoto | .......... H02K 11/25 310/68 C |

FOREIGN PATENT DOCUMENTS

| | | | |
|---|---|---|---|
| JP | 2013-051807 A | | 3/2013 |
| JP | 2015181985 A | * | 10/2015 |
| JP | 2018-125924 A | | 8/2018 |

OTHER PUBLICATIONS

JP2015181985A_Englishtranslation (Year: 2022).*

* cited by examiner

*Primary Examiner* — Tulsidas C Patel
*Assistant Examiner* — Viswanathan Subramanian
(74) *Attorney, Agent, or Firm* — Oliff PLC

(57) ABSTRACT

A temperature sensor in a rotating electric machine is disposed or installed on a surface of a temperature detection object. The temperature detection object, i.e., an installation portion, has a thickness. The temperature sensor has an inner case housing a detector element. The inner case is made of resin. The inner case has a thickness. A temperature detecting device has an outer case housing the temperature sensor. The outer case is made of resin. A linear expansion coefficient of the outer case is, within a certain temperature range including a threshold temperature for a protection of the rotating electric machine, is smaller than an average of linear expansion coefficients of the installation portion and the inner case.

8 Claims, 6 Drawing Sheets

(51) Int. Cl.
*G01K 7/22* (2006.01)
*H01C 7/00* (2006.01)

ROTATING ELECTRIC MACHINE, TEMPERATURE DETECTOR THEREOF, AND MANUFACTURING METHOD AND PROTECTION METHOD THEREOF

CROSS REFERENCE TO RELATED APPLICATION

The present application is based on and claims the benefit of priority of Japanese Patent Application No. 2019-034670, filed on Feb. 27, 2019, the disclosure of which is incorporated herein by reference.

TECHNICAL FIELD

The present disclosure generally relates to a rotating electric machine, a temperature detector thereof, and a manufacturing method and a protection method thereof.

BACKGROUND INFORMATION

In the related art, in order to detect temperature stably, it is desirable for the temperature sensor and the temperature detection object to be in stable contact. In the related art, however, there are problems producing this stability. As such, there is a need for further improvements in the rotating electric machine, its temperature detector, its method of manufacture, and its method of protection to provide better stability between the temperature sensor and the temperature detection unit.

SUMMARY

It is an object of the present disclosure to provide a rotating electric machine in which a temperature sensor and an object of temperature detection stably contact, a temperature detector thereof, a method of manufacturing the same, and a method of protecting the same.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
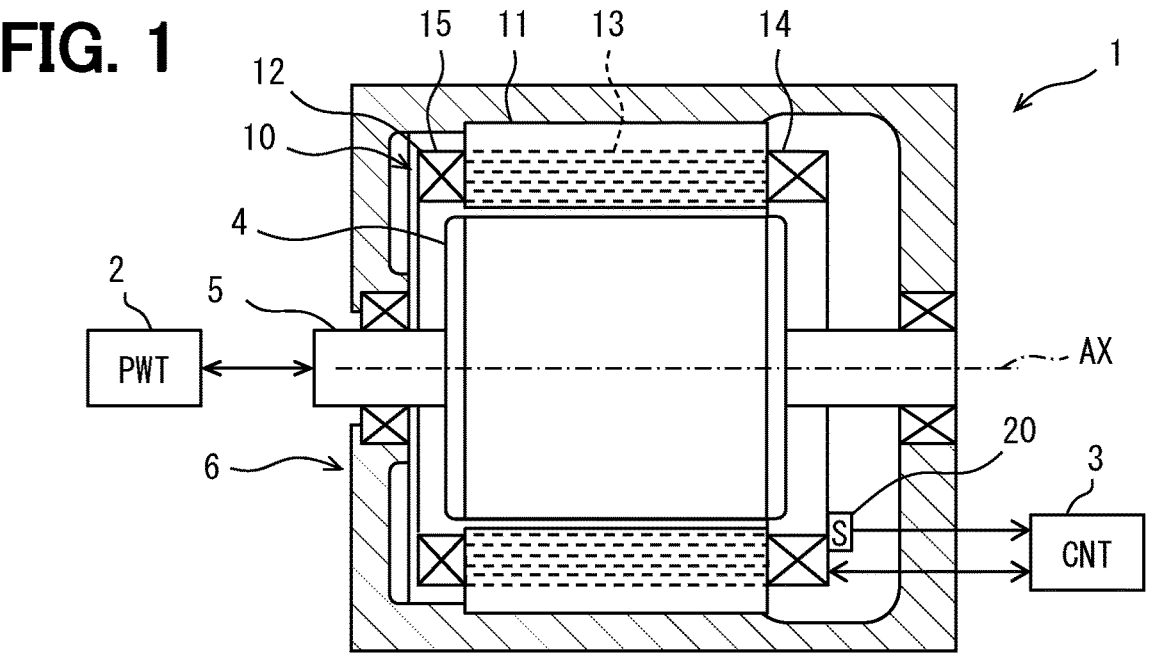
FIG. 1 is a cross-sectional view of a rotating electric machine according to a first embodiment.

Several embodiments of the present disclosure are described with reference to the drawings. In some embodiments, parts that are functionally and/or structurally corresponding to each other and/or associated with each other are given the same reference numerals, or reference numerals with different hundred digit or more digits. For corresponding parts and/or associated parts, reference can be made to the description of other embodiments.

First Embodiment

In FIG. 1, a rotating electric machine 1 is a motor generator. The rotating electric machine 1 is operatively connected to a power system 2 (PWT) of a device, or a machine in general. The rotating electric machine 1 can function as a generator that generates electric power by the power (i.e., a kinetic power) supplied from the power system 2. The rotating electric machine 1 can also function as a motor that supplies power to the power system 2. The rotating electric machine 1 may alternatively be a generator or an electric motor. The power system 2 may include an internal combustion engine. The power system 2 provides the main power of the device. In the specification of the present disclosure, the device includes a vehicle, an air conditioner, a water pump, and the like. Further, the term "vehicle" is used broadly herein, and may include, for example, automobiles, ships, aircrafts, simulation devices, and amusement devices.

The rotating electric machine 1 is electrically connected to a control device (CNT) 3. The control device 3 includes an inverter circuit. When the rotating electric machine 1 functions as a generator, it is driven by the power system 2 and outputs electric power. The control device 3 functions as a rectifier circuit that rectifies the electric power output from the rotating electric machine 1 when the rotating electric machine 1 is used as a generator. The rotating electric machine 1 supports the rotation of the power system 2 when functioning as a motor. The control device 3 supplies multi-phase/polyphase alternating current (AC) as electric power to the rotating electric machine 1 when the rotating electric machine 1 is used as a motor. In the present embodiment, the polyphase AC power is three-phase power.

The rotating electric machine 1 has a rotor 4 and a stator 10. The rotor 4 is rotatable around the axis AX. The stator 10 is a cylindrical member having the axis AX. In the following description, the terms axial direction, radial direction and circumferential direction are defined by, or, with reference to, the axis AX. The rotor 4 and the stator 10 are housed in a housing 6. The housing 6 fixes, or stationarily holds, the stator 10 and rotatably supports the rotor 4. The housing 6 may provide, i.e., may serve as, parts of the power system 2. For example, the housing 6 may provide part of a crankcase or part of a transmission case.

The rotor 4 is magnetically coupled to the stator 10. The rotor 4 is rotatably supported relative to the housing 6 by a shaft 5. The shaft 5 provides, i.e., serves as, a rotation shaft. The rotating shaft is connected to the power system 2. The rotor 4 is disposed radially inward of the stator 10. The rotor 4 has a plurality of magnetic poles arranged along the circumferential direction. The plurality of magnetic poles are formed by a plurality of permanent magnets embedded in the rotor 4. The rotor 4 can be provided by various structures. The rotor 4 has, for example, eight (four N poles and four S poles) magnetic poles.

The stator 10 has a stator core 11. The stator core 11 has a cylindrical shape. The stator core 11 may also have an annular shape. The stator core 11 has a plurality of steel plates stacked along the axial direction. The stator core 11 has a plurality of circumferentially arranged slots. The plurality of slots are arranged at equal pitches/intervals along the circumferential direction. The plurality of slots may be arranged at several different pitches. The plurality of slots extend in the axial direction so as to penetrate the plurality of steel plates. Further, the plurality of slots respectively widen along a radius thereof. The stator core 11 typically has an annular back core. The stator core 11 has a plurality of teeth extending radially inward from the back core. The plurality of teeth form a plurality of slots between them.

The stator 10 has a stator coil 12. The stator coil 12 is mounted on the stator core 11. The stator coil 12 has a straight portion 13 and coil ends 14 and 15. The straight portion 13 extends straight along the axial direction. The straight portion 13 is accommodated in the slot. The coil ends 14, 15 are located at the end of the stator core 11. The coil ends 14, 15 project axially from the stator core 11. The coil end 14/15 is an assembly of a plurality of segment conductors included in the stator coil 12. At the coil ends 14, 15, one segment conductor connects the straight portion 13 located in one slot to the straight portion 13 located in another, different slot. The coil ends 14, 15 may be provided as turns (i.e., bending parts) of a continuous segment conductor. The coil ends 14, 15 may be provided/as joints joining different segment conductors.

One coil may be provided by a continuous line or by joining multiple segments. In the present embodiment, one coil is provided by a plurality of joined segments. Note that the plurality of segments can be joined by various joining methods. The joining method can be, for example, TIG welding, electric resistance welding, solder bonding, and the like. Also, one coil is a coil that can be regarded as one phase. One coil may include therein a plurality of coil elements having different electric angles. For example, one coil can include multiple coil elements that differ by several degrees in the electric angle.

The stator coil 12 may have a wire connection unit. The wire connection unit electrically connects the stator coils 12 to form a polyphase wire connection. The wire connection unit connects a plurality of lead wires to provide a star connection or a delta connection. The connection unit includes a plurality of connection conductors. The plurality of wire connection conductors are connection members for the stator coil 12. The plurality of wire connection conductors are made of a conductive member. The wire connection unit has an end conductor that provides three input/output ends (i.e., designated as power ends, hereafter) in a star connection. The wire connection unit has a neutral point conductor that provides a neutral point in the star connection. The wire connection conductor may also be called a bus bar.

The rotating electric machine 1 includes a temperature detector 20. The temperature detector 20 detects temperature of the stator coil 12. Temperature of the stator coil 12 is detected at the straight portion 13 or at the coil ends 14, 15. The temperature detector 20 detects temperature of the conductor providing the stator coil 12. The temperature detector 20 detects, for example, temperature of a surface of the conductor at the coil end 14, 15. The temperature detector 20 detects temperature of the surface of a winding conductor, the segment conductor, or a connecting conductor at the coil ends 14, 15. In the illustrated example of FIG. 1, the temperature detector 20 detects temperature at the coil end 14. The temperature detector 20 outputs an electric signal indicating a detected temperature. A detection signal of the temperature detector 20 is input to the control device 3. The control device 3 stores temperature data indicated by the detection signal in a memory. A processor of the control device 3 performs control processing according to the temperature data by accessing the memory.

Figure 2:
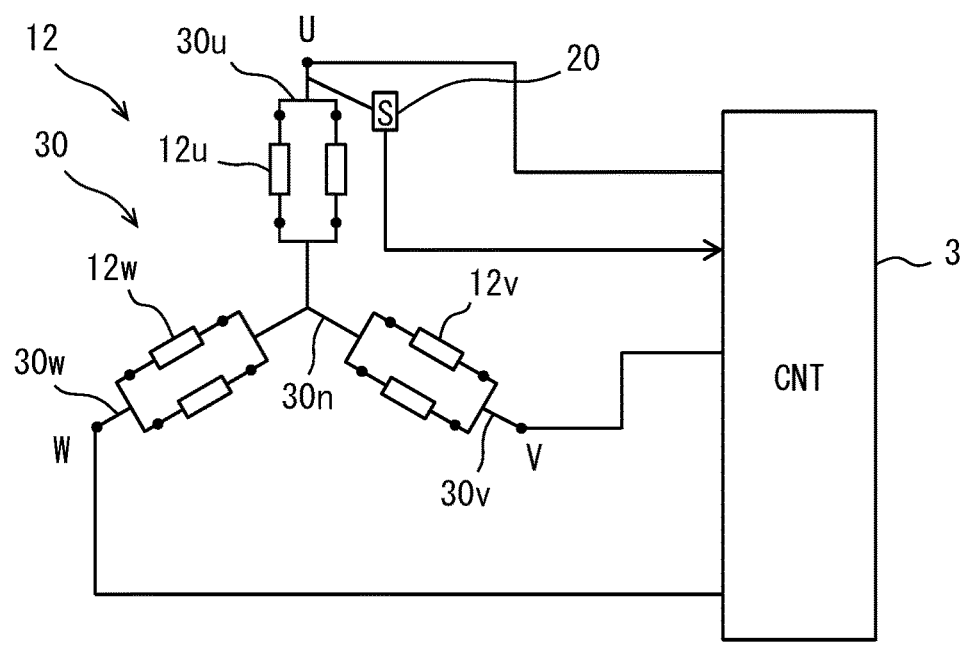
FIG. 2 is a circuit diagram of a stator coil.

FIG. 2 shows a polyphase connection of the stator coil 12. The stator coil 12 adopts a star connection as a polyphase connection. The stator coil 12 has a U phase, a V phase, and a W phase. The stator coil 12 has a plurality of U-phase coils 12*u* serving as a U phase. The stator coil 12 has a plurality of V-phase coils 12*v* serving as a V phase. The stator coil 12 has a plurality of W-phase coils 12*w* serving as a W phase. The stator coil 12 can comprise one or more phase coils in one phase. In addition, the stator coil 12 may be provided with a plurality of sets of polyphase wire connections. In the present embodiment, the stator coil 12 has two U-phase coils 12*u*, two V-phase coils 12*v*, and two W-phase coils 12*w*. The stator coil 12 comprises one set of polyphase wire connections.

The plurality of wire connection conductors 30 include a U-phase wire connection conductor 30*u* providing a U-phase power end. The U-phase wire connection conductor 30*u* is connected to a plurality of U-phase coils 12*u* respectively at a plurality of junctions. The U-phase wire connection conductor 30*u* is connected to a corresponding power terminal. Thus, the U-phase wire connection conductor 30*u* provides a so-called crossover line connecting the two U-phase coils 12*u* to the power end. The plurality of wire connection conductors 30 include a V-phase wire connection conductor 30*v* that provides a V-phase power end. The V-phase wire connection conductor 30*v* is connected to a plurality of V-phase coils 12*v* respectively at a plurality of junctions. The V-phase wire connection conductor 30*v* is connected to a corresponding power terminal. Thus, the V-phase wire connection conductor 30*v* provides a so-called crossover line connecting the two V-phase coils 12*v* to the power end. The plurality of wire connection conductors 30 include a W-phase wire connection conductor 30*w* that provides a W-phase power end. The W-phase wire connection conductor 30*w* is connected to a plurality of W-phase coils respectively at a plurality of junctions. The W-phase wire connection conductor 30*w* is connected to the power terminal. Thus, the W-phase wire connection conductor 30*w* provides a so-called crossover line connecting the two W-phase coils 12*w* to the power end. The plurality of wire connection conductors 30 include a neutral point wire connection conductor 30*n*. The neutral point wire connection conductor 30*n* provides a star connection. One neutral point wire connection conductor 30*n* is joined to coil ends of the plurality of phase coils 12*u*, 12*v*, 12*w* at a plurality of junctions for a connection to the neutral point.

The temperature detector 20 is provided on one of the plurality of wire connection conductors 30. In the illustrated example of FIG. 2, the temperature detector 20 is provided on the U-phase wire connection conductor 30*u*. The temperature detector 20 detects temperature of the U-phase wire connection conductor 30*u* as a representative temperature of the stator coil 12. The temperature detector 20 may be provided on each of the plurality of connection conductors 30. In such a case, either a detected temperature indicated by any one temperature detector 20 or an average temperature can be used.

Figure 3:
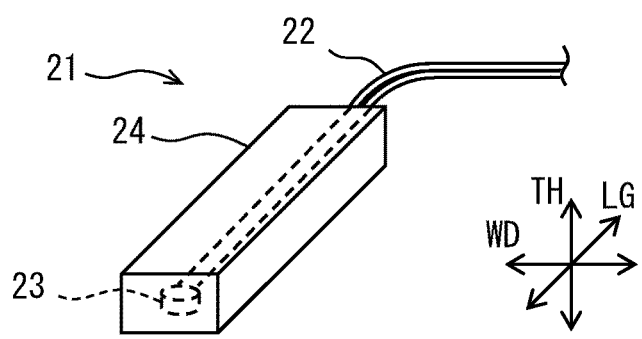
FIG. 3 is a perspective view of a temperature sensor.

FIG. 3 shows a temperature sensor 21 included in the temperature detector 20. The temperature sensor 21 has three dimensions, i.e., dimensions in a longitudinal direction LG, a width direction WD, and a thickness direction TH (i.e., a stacking direction TH). The temperature sensor 21 has a so-called rectangular parallelepiped body, or a cuboid. The temperature sensor 21 is a so-called thermistor type temperature sensor. Since the temperature sensor 21 is intended to measure temperature, it may also be other types of temperature sensors, such as a PTC thermistor, an NTC thermistor, a linear resistor, a thermocouple, or the like. The temperature sensor 21 has a lead wire 22 for outputting an electric signal, a detector element 23, and an inner case 24. The detector element 23 is a thermistor. The detector element 23 is illustrated in a cylindrical shape in FIG. 3, but may be provided in various shapes such as a rectangular shape or the like. The lead wire 22 extends from the detector element 23. The lead wire 22 is connected to the control device 3. The inner case 24 is made of resin. The inner case 24 covers a part of the lead wire 22 and the detector element 23. The inner case 24 is a molded article formed by molding a part of the lead wire 22 and the detector element 23 in a mold for covering them. The inner case 24 may also be referred to as an insert-molded article in which part of the lead wire 22 and the detector element 23 are insert parts. The inner case 24 may also be referred to as a mold-formation article that encloses part of the lead wire 22 and the detector element 23. Therefore, the temperature sensor 21 encloses the detector element 23 by the inner case 24 made of resin. The temperature sensor 21 can be implemented as various temperature sensors available in the market.

Figure 4:
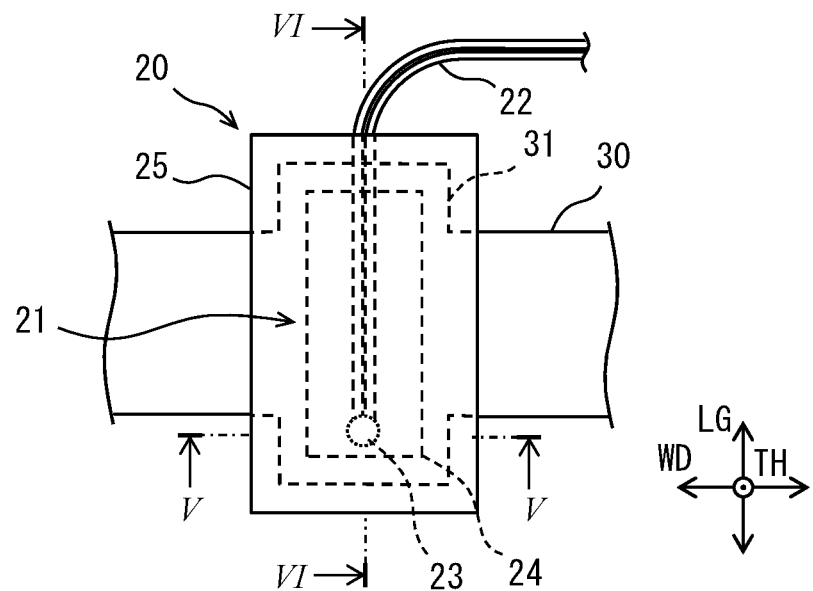
FIG. 4 is a plan view of a temperature detector.

FIG. 4 shows the temperature detector 20 in a plan view. The temperature detector 20 is disposed, or installed, on the surface of the wire connection conductor 30. The wire connection conductor 30 is a bus bar included in the wire connection unit. The temperature detector 20 may be disposed on the surface of the conductor serving as the phase coils 12u, 12v, 12w instead of being disposed on the wire connection conductor 30. The wire connection conductor 30 includes an installation portion 31. The installation portion 31 is a part of the stator coil 12 of the rotating electric machine 1. The wire connection conductor 30 and the installation portion 31 are integrally formed of/from a continuous/contiguous material, i.e., having one stretch of body. The temperature sensor 21 is stacked on the installation portion 31 in or along the stacking direction TH. As a result, the temperature sensor 21 includes the detector element 23 that outputs an electric signal indicating that temperature of the installation portion 31 has reached a predetermined threshold temperature Tth. The installation portion 31 provides an installation surface for arranging/disposing the temperature sensor 21. The installation surface is wider or broader than the temperature sensor 21. The installation portion 31 has a width wider than the wire connection conductor 30. The installation portion 31 provides an object which is a target of temperature detection. The installation portion 31 is also referred to as an island portion formed on a part of the wire connection conductor 30.

The temperature detector 20 has an outer case 25. The outer case 25 is made of resin. The outer case 25 encloses, or houses, the installation portion 31 and the temperature sensor 21. The outer case 25 covers the entire inner case 24 and a part of the lead wire 22 of the temperature sensor 21. The outer case 25 is a molded article which is made by molding the installation portion 31 and the temperature sensor 21 pre-disposed in a mold that covers them. The outer case 25 may also be referred to as an insert-molded article in which the installation portion 31 and the temperature sensor 21 are used as insert parts. The outer case 25 may also be referred to as a mold-formation article that encloses, or houses, the installation portion 31 and the temperature sensor 21.

The outer case 25 is larger than the inner case 24. The outer case 25 covers the entire inner case 24. A portion of the inner case 24 may be exposed from the outer case 25. For example, a contact surface between a holding pin for holding the inner case 24 at a prescribed position and the inner case 24 may be exposed from the outer case 25 in some cases. The outer case 25 is larger than the installation portion 31. The outer case 25 covers all of the installation portion 31 and a part of the wire connection conductor 30. Also in such a case, a part of the installation portion 31 may be exposed from the outer case 25. For example, a contact surface between the holding pin for holding the installation portion 31 at a prescribed position and the installation portion 31 may be exposed from the outer case 25 in some cases.

Figure 5:
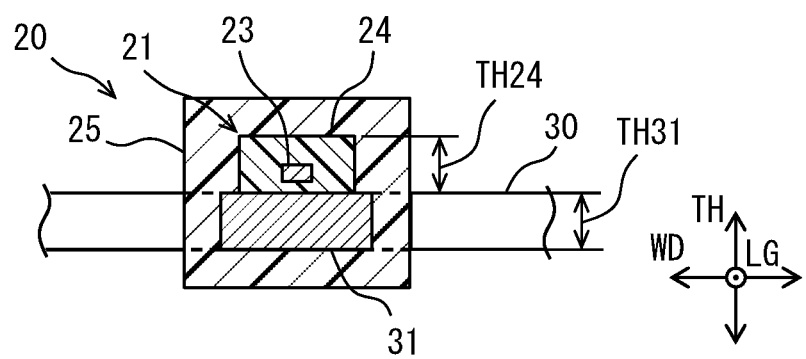
FIG. 5 is a cross-sectional view taken along line V-V of the temperature detector in FIG. 4.
Figure 6:
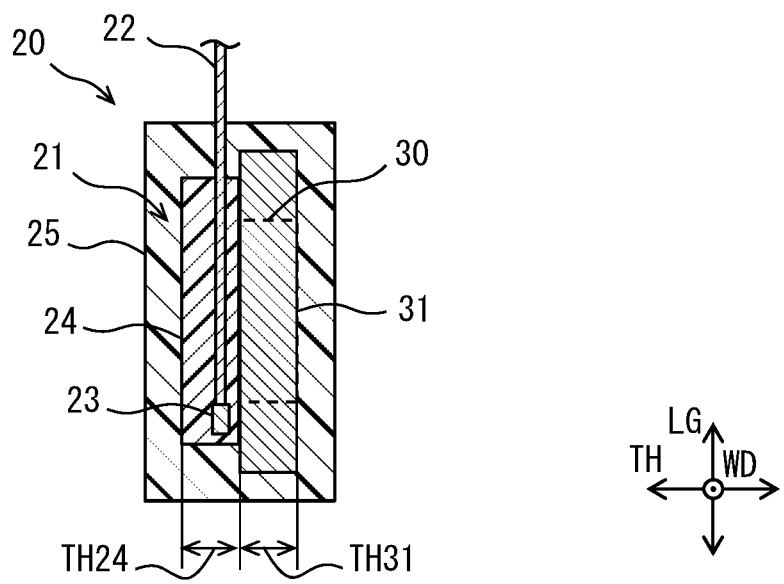
FIG. 6 is a cross-sectional view taken along line VI-VI of the temperature detector in FIG. 4.

FIG. 5 shows a V-V cross section of FIG. 4. FIG. 6 shows a VI-VI cross section of FIG. 4. FIGS. 5 and 6 show a cross section that "cuts" the detector element 23. As illustrated, the inner case 24 is in contact with the installation portion 31. When the inner case 24 contacts the installation portion 31, the detector element 23 detects temperature of the installation portion 31 with high accuracy. Temperature of the installation portion 31 directly or indirectly indicates temperatures of the wire connection conductor 30, the coil end 14, and the stator coil 12. When the inner case 24 contacts the installation portion 31 stably, the detector element 23 detects temperature of the installation portion 31 stably. Further, it may be desirable that the inner case 24 and the installation portion 31 are in stable contact in a wide temperature range. It may also be desirable that the inner case 24 and the installation portion 31 be in stable contact in an operating temperature range where the rotating electric machine 1 is used. The operating temperature range is a high temperature range, for example, higher than a room (i.e., normal) temperature zone of around 20 degrees Celsius.

When the installation portion 31, the inner case 24, and/or the outer case 25 expand or contract, the strength of contact (e.g., a degree of stability of contact) between the installation portion 31 and the inner case 24 varies.

Further, when the installation portion 31, the inner case 24, and/or the outer case 25 expand or contract, the installation portion 31 and the inner case 24 may lose contact with each other. In the present embodiment, a linear expansion coefficient of the outer case 25 is planned and realized so that a stable contact state is maintained between the installation portion 31 and the inner case 24.

The wire connection conductor 30 is made of copper or a copper alloy for an electrical conductor. The wire connection conductor 30 may be made of aluminum or an aluminum alloy. The inner case 24 and the outer case 25 are made of resin. The inner case 24 is made of polyphenylene sulfide (PPS) resin. The inner case 24 may be made of epoxy resin. The inner case 24 may be made of fluorine resin. The outer case 25 is made of polyphenylene sulfide (PPS) resin. The outer case 25 may be made of nylon resin (for example, PA6T). The outer case 25 includes at least one filler. The outer case 25 may include a filler in order to adjust the linear expansion coefficient. The outer case 25 may include a plurality of fillers. The plurality of fillers can include a filler that exhibits isotropy with respect to the linear expansion coefficient and a filler that exhibits anisotropy with respect to the linear expansion coefficient. The filler is provided as a glass filler or the like.

Figure 7:
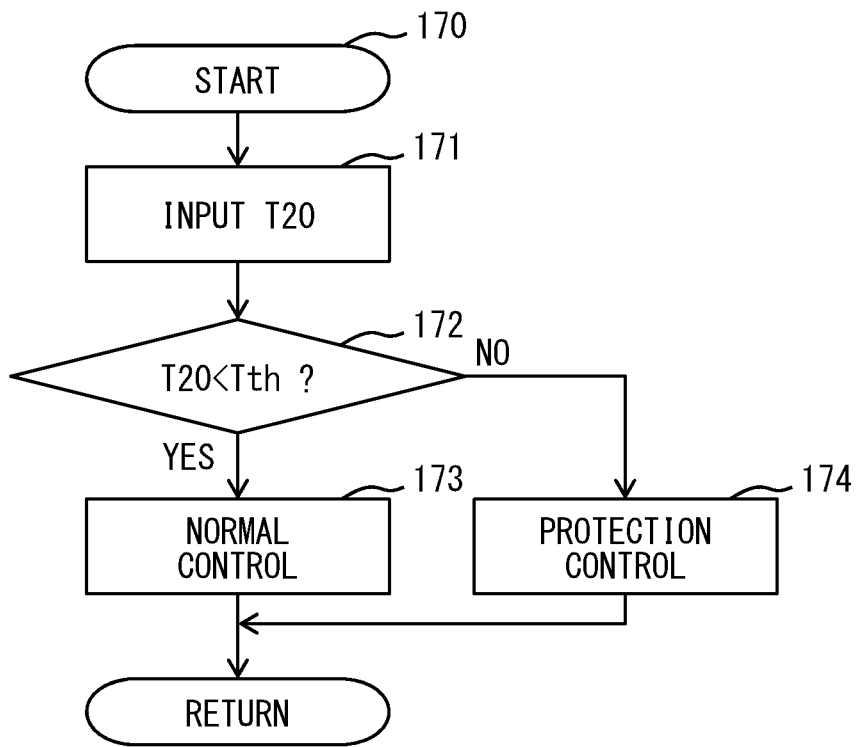
FIG. 7 is a flowchart of a protection control.

FIG. 7 shows a control process 170 performed by the control device 3 by using a processor. The control device 3 selectively performs a normal control and a protection control based on a detected temperature T20 detected by the temperature detector 20. The control device 3 compares the detected temperature T20 with a preset temperature threshold Tth. The control device 3 performs the normal control when the detected temperature T20 is less than the threshold temperature Tth (T20<Tth). In the normal control, control as a generator or control as a motor is performed. When the detected temperature T20 is equal to or higher than the threshold temperature Tth (T20≥Tth), the control device 3 performs the protection control for protecting the rotating electric machine 1. In the protection control, the electric current flowing through the stator coil 12 is limited. The limitation on the electric current includes, i.e., may be implemented as, limitation of the electric current to a preset value, and limitation of the electric current to zero (Ampere), for example.

In Step 171, the control device 3 receives an input of the detected temperature T20 from the temperature detector 20. The detected temperature T20 is stored in the memory as temperature data. The processor obtains temperature data by accessing the memory. In Step 172, the control device 3 compares the detected temperature T20 with the threshold temperature Tth. If the detected temperature T20 is less than the threshold temperature Tth (T20<Tth), the process branches to YES. If the detected temperature T20 is equal to or higher than the threshold temperature Tth (T20 Tth), the process branches to NO. The control device 3 determines in Step 172 that temperature of the installation portion 31 has reached the threshold temperature Tth. In Step 173, the control device 3 performs the normal control. In Step 174, the control device 3 performs the protection control. The processes of Steps 171, 172, 174 provide a protection step of activating the protection control for protecting the rotating electric machine 1 when the detected temperature T20 has reached the threshold temperature Tth.

Figure 8:
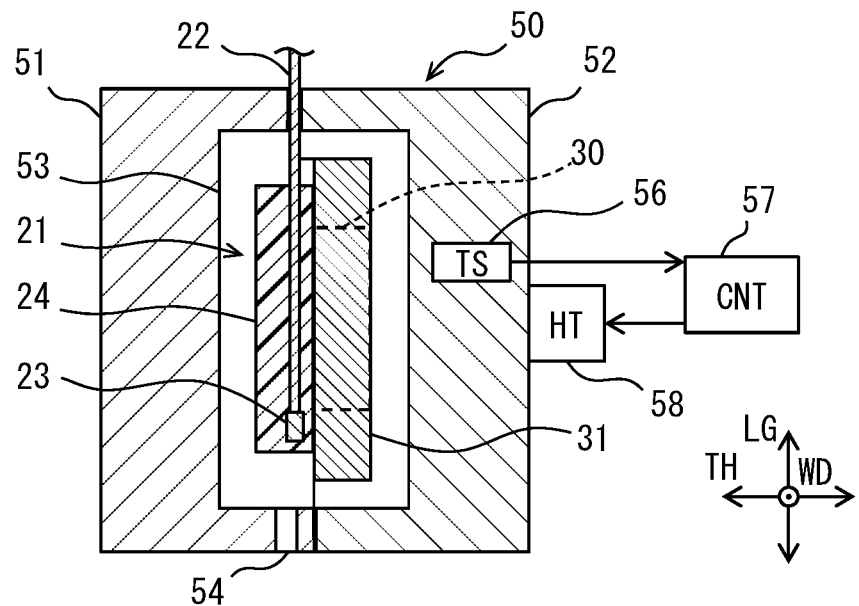
FIG. 8 is a cross-sectional view of a manufacturing apparatus of the temperature detector.

FIG. 8 shows a manufacturing apparatus used in a manufacturing method of manufacturing the temperature detector 20. The method manufacturing of a temperature detector includes a molding process using a mold 50 for resin molding the outer case 25. The manufacturing method includes an arrangement process of arranging/disposing the temperature sensor 21 and the installation portion 31 of the wire connection conductor 30 in the mold 50 before the molding process. The manufacturing method includes an assembling process of assembling the wire connection conductor 30 in which the temperature detector 20 is formed as a part of the coil end 14 after the molding process. The molding process includes a closing process that forms a cavity inside the mold 50 by closing the mold 50. The molding process includes an injection process of injecting the outer case 25 into the cavity. The molding process includes a take-out process of opening the mold 50 and taking out the wire connection conductor having the molded temperature detector. Further, the manufacturing method includes a temperature control process of maintaining temperature of the mold 50 at a target temperature at least in the injection process. Temperature control may be performed continuously throughout the closing process, the injection process and the take-out process. Temperature control may be performed prior to the closing process.

The mold 50 has a first mold 51 and a second mold 52. The first mold 51 and the second mold 52 define a cavity 53 for the outer case 25. In the cavity 53, the installation portion 31 and the temperature sensor 21 are accommodated. The mold 50 comprises a gate 54 for injecting a resin material. The gate 54 is open at one end of the cavity 53 in the longitudinal direction LG. The gate 54 forms a trace on the outer case 25 after molding. By the gate 54 being located at the end of the longitudinal direction LG, the resin material mainly flows along the longitudinal direction LG. At such time, the filler also mainly flows in the longitudinal direction LG. As a result, the longitudinal direction of the filler is arranged along the longitudinal direction LG. The orientation direction of the filler is the longitudinal direction LG.

The manufacturing apparatus comprises a mold temperature detector 56. The mold temperature detector 56 detects temperature of the mold 50. Temperature of the mold 50 is detected at, or as temperature of, the second mold 52. The mold temperature detector 56 outputs an electric signal indicating the detected temperature. The manufacturing apparatus includes a mold control device (CNT) 57. The detection signal of the mold temperature detector 56 is input to a mold control device 57. The mold control device 57 stores temperature data indicated by the detection signal in a memory. The processor of the mold control device 57 performs a control process according to the temperature data by accessing the memory. The mold control device 57 controls an amount of heat generation of a heater 58. The heater 58 regulates or adjusts temperature of the mold 50. The mold temperature detector 56, the mold control device 57, and the heater 58 provide a feedback control system that feedback-controls the temperature of the mold 50.

The control device 3 and the mold control device 57 in the specification may also be referred to as an electronic control unit (ECU). The control device or the control system is provided either by (a) an algorithm as a plurality of logics called an if-then-else form, or (b) a learned model tuned by machine learning, e.g., an algorithm as a neural network.

The control device is provided by a control system that includes at least one computer. The control system may include multiple computers linked by a data communication device. The computer includes at least one processor (i.e., a hardware processor) that is hardware. The hardware processor can be provided by one of the following (i), (ii) or (iii).

(i) The hardware processor may be at least one processor core that performs a program stored in at least one memory. In such a case, the computer is provided by, or implemented as, at least one memory and at least one processor core. The processor core may be referred to as CPU: Central Processing Unit, GPU: Graphics Processing Unit, RISC-CPU, etc., for example. The memory may also be referred to as a storage medium. The memory is a non-transitory, tangible storage medium that non-temporarily stores "programs and/or data" readable by a processor. The storage medium is provided by a semiconductor memory, a magnetic disk, an optical disk or the like. A program may be distributed alone, i.e., by itself, or as a storage medium storing the program.

(ii) The hardware processor may be a hardware logic circuit. In such a case, the computer is provided by, or implemented as, a digital circuit including a number of programmed logic units (i.e., gate circuits). The digital circuit may also be referred to as a logic circuit array such as, for example, ASIC: Application-Specific Integrated Circuit, FPGA: Field Programmable Gate Array, SoC: System on a Chip, PGA: Programmable Gate Array, CPLD: Complex Programmable Logic Device or the like. The digital circuit may comprise a memory storing programs and/or data. The computer may be provided by an analog circuit. The computer may be provided as a combination of a digital circuit and an analog circuit.

(iii) The hardware processor may be a combination of the above-described (i) and the above-described (ii). The hardware processors (i) and (ii) are placed on different chips or on one, common chip. In these cases, the part (ii) is also called an accelerator.

The control device, the signal source and the controlled object provide various elements. At least some of those elements can be referred to as blocks, modules, or sections. Further, the elements contained in the control system are referred to as functional means only when the element is intentional.

The control unit described in the present disclosure and the method thereof may be realized by a dedicated computer provided by combining a processor and a memory programmed to perform one or more functions embodied by a computer program. Alternatively, the control unit and the method described in the present disclosure may be realized by a dedicated computer provided by configuring a processor with one or more dedicated hardware logic circuits. Alternatively, the control unit and the method described in the present disclosure may be realized by one or more dedicated computers configured as a combination of (i) a processor and a memory programmed to perform one or more functions and (ii) a processor configured by one or more hardware logic circuits. Further, computer programs may be stored, as instructions being executable by a computer, in a tangible, non-transitory computer-readable medium.

Figure 9:
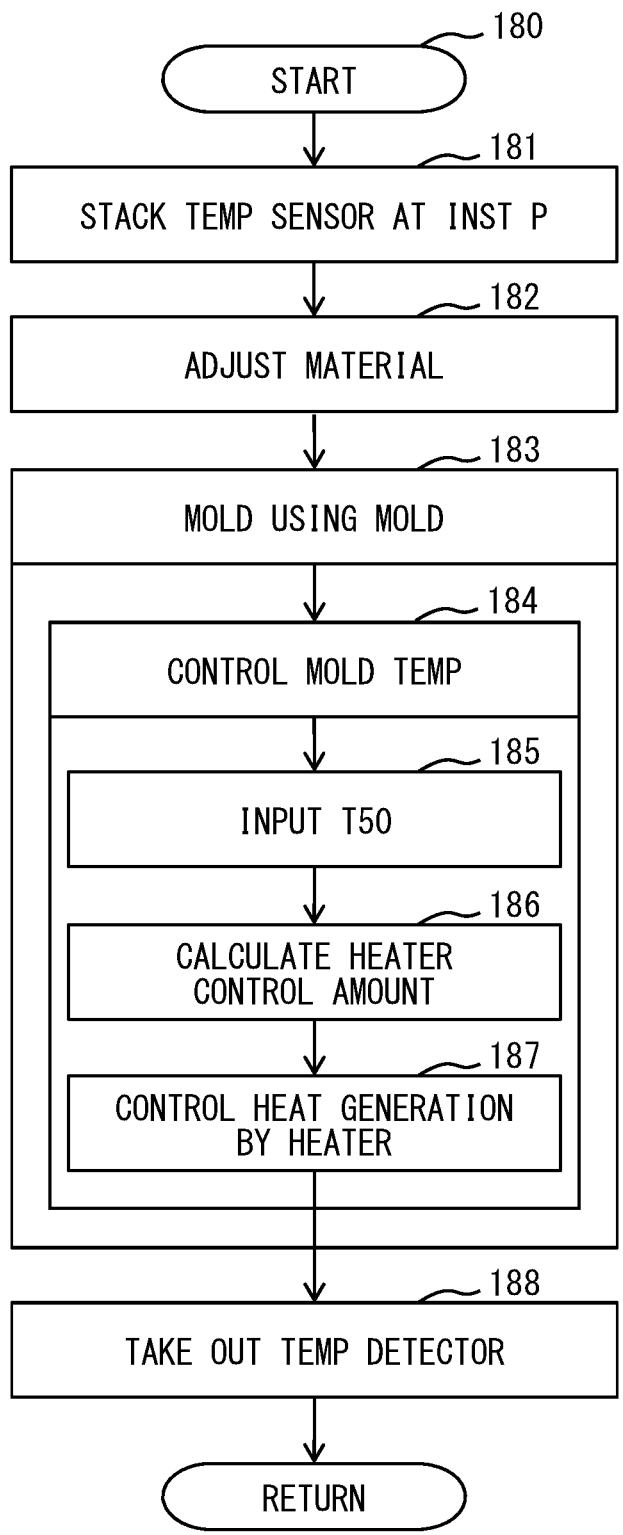
FIG. 9 is a flowchart of a temperature control of a resin mold.

FIG. 9 shows a manufacturing method 180 of a temperature detector of the rotating electric machine. After performing the manufacturing method 180, the control process 170 is performed to implement the control method of the rotating electric machine. The manufacturing method 180 performs a stacking step in Step 181. In Step 181, the temperature sensor 21 is stacked on the installation portion 31 along the stacking direction TH.

The manufacturing method 180 performs an adjustment step in Step 182. In Step 182, the resin material forming the outer case 25 is adjusted. The adjustment step includes selection of the resin material, selection of the filler, adjustment of an injection temperature, and the like. The adjustment step may be performed before Step 181. In the adjustment step, a linear expansion coefficient AL25 of the outer case 25 in a temperature range that exceeds a target temperature Ttg described later and is equal to or lower than the threshold temperature Tth is adjusted. The linear expansion coefficient AL25 is adjusted to be smaller than a composite linear expansion coefficient ALav. The composite linear expansion coefficient ALav is a value obtained by composing or combining a linear expansion coefficient AL31 of the installation portion 31 in the operating temperature range and a linear expansion coefficient AL24 of the inner case 24 in the operating temperature range. The composite linear expansion coefficient ALav may also be referred to as an average linear expansion coefficient.

The manufacturing method 180 performs a molding step in Step 183. In Step 183, the resin material is injected and supplied into the mold 50. In Step 183, the outer case 25 made of resin is molded by the mold 50 so as to enclose the installation portion 31 and the temperature sensor 21 in the outer case 25. Step 183 includes Step 184.

The manufacturing method 180 performs a mold temperature control step in Step 184. Step 184 controls temperature of the mold 50 to the target temperature Ttg. Step 184 includes steps 185-187. Step 184 is performed by the processor of the mold control device 57. The mold control device 57 receives an input of the detected temperature T50 from the mold temperature detector 56 in Step 185. The detected temperature T50 is stored in the memory as temperature data. The processor obtains temperature data by accessing the memory. In Step 186, the mold control device 57 compares the detected temperature T50 with the target temperature Ttg. Here, a control amount of the heater 58 for controlling the detected temperature T50 to the target temperature Ttg is calculated. PID control etc. can be used for calculation processing. When the heater 58 is an electric heater, the amount of energization (i.e., electric power supplied) to the heater 58 is calculated here. The mold control device 57 controls heat generation of the heater 58 in Step 187. Here, for example, the electric current flowing through the heater 58 is controlled. As a result, temperature of the mold 50 is controlled and maintained at the target temperature Ttg.

The target temperature Ttg of the mold 50 is set to control a pressing force applied from the outer case 25 to the temperature sensor 21 and to the installation portion 31 to be smaller than an allowable value. The pressing force is a force that presses the temperature sensor 21 and the installation portion 31 to contact with each other. Therefore, the target temperature Ttg may also be called as an allowable temperature. In other words, at the final stage of the molding process, the outer case 25 injected into the cavity 53 binds the temperature sensor 21 and the installation portion 31 into contact with each other. Further, at such time, the pressing force applied to the temperature sensor 21 and the installation portion 31 by the outer case 25 becomes smaller than the allowable value. The target temperature Ttg of the mold 50 is higher than, for example, normal room temperature. The pressing force applied by the outer case 25 is considered to be smaller than the allowable value at the target temperature Ttg. In many embodiments, the pressing force applied by the outer case 25 is zero (0) or more at the target temperature Ttg. As a result, when the molded product is taken out from the mold 50, the temperature of the outer case 25 decreases toward the ambient environmental temperature, and the outer case 25 contracts. On the other hand, when the rotating electric machine 1 is in use, the temperature of the outer case 25 rises. In the present embodiment, the linear expansion coefficient AL25 of the outer case 25 is set to realize a stable contact between the temperature sensor 21 and the installation portion 31, or is set to bring the two parts into stable contact, with each other in the temperature range as further discussed above.

The manufacturing method 180 performs an ejection step in Step 188. Step 188 takes out the temperature detector 20 obtained by resin molding from the mold 50.

Referring back to FIGS. 5 and 6, FIGS. 5 and 6 show the thickness of the installation portion 31 and the inner case 24 along the stacking direction TH. The installation portion 31 has a thickness TH31. The installation portion 31 has the linear expansion coefficient AL31. The inner case 24 has a thickness TH24. The inner case 24 has the linear expansion coefficient AL24 along the stacking direction TH. In order to detect the temperature of the stator coil 12 with high accuracy, contact between the installation portion 31 and the inner case 24 along the stacking direction TH is required. The linear expansion coefficient of the installation portion 31 and the linear expansion coefficient of the inner case 24 can be evaluated as their composite value. However, it is necessary to consider the thickness TH31 of the installation portion 31 and the thickness TH24 of the inner case 24. In consideration of the thickness TH31 of the installation portion 31 and the thickness TH24 of the inner case 24, the composite linear expansion coefficient ALav is approximately represented by the following equation (1).

$$ALav = (TH31 \times AL31 + TH24 \times AL24)/(TH31 + TH24) \quad (1)$$

The linear expansion coefficient AL31 is a linear expansion coefficient of the installation portion 31 in the temperature range. The linear expansion coefficient AL24 is a linear expansion coefficient of the inner case 24 in the temperature range. The composite linear expansion coefficient ALav is a linear expansion coefficient obtained by composing/combining the linear expansion coefficient AL31 and the linear expansion coefficient AL24.

In the present embodiment, the following equation (2) is established in a temperature range from the target temperature Ttg of the mold 50 to the temperature threshold Tth at which the protection control is performed.

$$AL25 < ALav \quad (2)$$

That is, the linear expansion coefficient AL25 of the outer case 25 is set to be smaller than the composite linear expansion coefficient ALav in the temperature range in which the rotating electric machine 1 is used, that is, in the high temperature range. As a result, the temperature is stably detected at or around the temperature threshold Tth at which stable temperature detection is required. As a result, the reliability of protection control performed based on the temperature threshold Tth can be improved.

Figure 10:
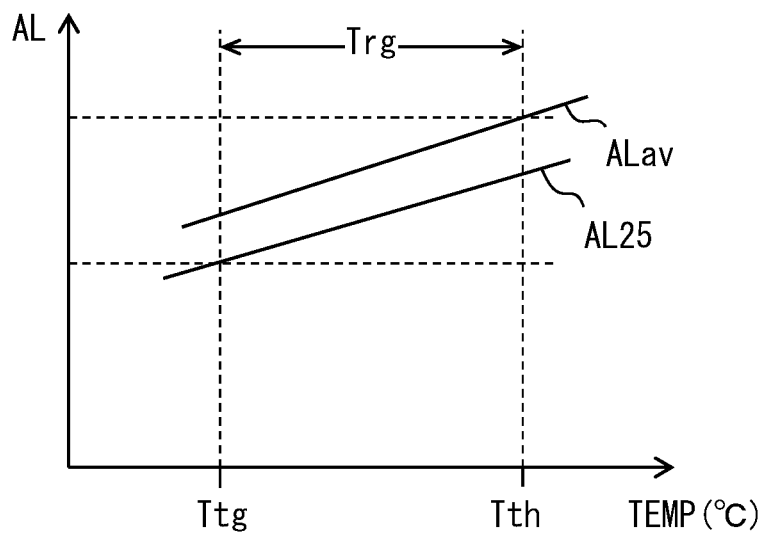
FIG. 10 is a graph of a linear expansion coefficient.

FIG. 10 is a graph schematically showing the linear expansion coefficient AL25 of the outer case 25 and the composite linear expansion coefficient ALav. A temperature range Trg in which the rotating electric machine 1 is used is indicated as a range between the target temperature Ttg as the allowable temperature and the threshold temperature Tth for the protection control. The temperature range includes the threshold temperature Tth. In many cases, the threshold temperature Tth is set near an upper limit of operation of the rotating electric machine 1. Therefore, the temperature range extends from and below the threshold temperature Tth. The linear expansion coefficient AL25 of the outer case 25 in such temperature range is set to be smaller than the composite linear expansion coefficient ALav. The composite linear expansion coefficient ALav is a value obtained by composing or combining the linear expansion coefficient AL31 of the installation portion 31 in the temperature range and the linear expansion coefficient AL24 of the inner case 24 in the temperature range.

The threshold temperature Tth is a protection temperature for protecting the stator coil 12. The temperature range is higher than the allowable temperature and is equal to or lower than the threshold temperature Tth. The allowable temperature is a temperature at which the pressing force applied from the outer case 25 to the installation portion 31 and to the inner case 24 becomes smaller than the allowable value. The allowable value is a value of pressing force required for the temperature sensor 21 to stably detect the temperature of the installation portion 31. The allowable value may be zero (0). Thereby, the contact state between the installation portion 31 and the inner case 24 is stably maintained by the outer case 25.

The linear expansion coefficient AL25 and the composite linear expansion coefficient ALav are set such that the pressing force from the outer case 25 to the installation portion 31 and the inner case 24 increases as the temperature rises from the allowable temperature toward the threshold temperature Tth. As described above, the composite linear expansion coefficient ALav has a value obtained by composing or combining the linear expansion coefficient AL31 and the linear expansion coefficient AL24 according to the thickness TH31 and the thickness TH24. In other words, the composite linear expansion coefficient ALav is, for example, an average linear expansion coefficient obtained by averaging the linear expansion coefficient AL31 and the linear expansion coefficient AL24 according to the thickness TH31 and the thickness TH24.

The linear expansion coefficient AL25 satisfies the above equation (2) regardless of the orientation direction of the filler of the outer case 25. That is, the linear expansion coefficient AL25 satisfies the equation (2) in the direction parallel to the longitudinal direction LG which is the orientation direction or in the direction perpendicular to the orientation direction.

In a typical exemplary embodiment, the threshold temperature Tth is set in a range of 150 degrees Celsius or more and 200 degrees Celsius or less. In such a case, the target temperature Ttg is set to 130 degrees Celsius or more and the threshold temperature Tth or less.

According to the embodiment described above, the temperature sensor 21 and the object of temperature detection are enclosed by the resin of the outer case 25. The linear expansion coefficient AL25 of the outer case 25 in the temperature range is set to be smaller than the composite linear expansion coefficient ALav in the temperature range. The temperature range is the high temperature range exceeding normal room temperature. Therefore, in the temperature range, the outer case 25 maintains the contact between the temperature sensor 21 and the installation portion 31 without loosening. As a result, the temperature can be stably detected in such temperature range.

Second Embodiment

Figure 11:
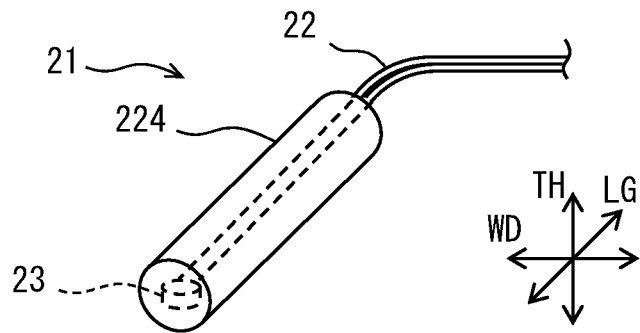
FIG. 11 is a perspective view of the temperature sensor according to a second embodiment.

The present embodiment is a modification in which the preceding embodiment is employed as a base fundamental form. In the above embodiment, a rectangular parallelepiped temperature sensor 21 is used. Alternatively, the temperature sensor 21 can be provided in various shapes. In FIG. 11, the temperature sensor 21 has a cylindrical inner case 224. In the present embodiment, the contact state between the temperature sensor 21 and the installation portion 31 can be stably maintained in the operating temperature range exceeding the temperature of the mold 50.

Third Embodiment

Figure 12:
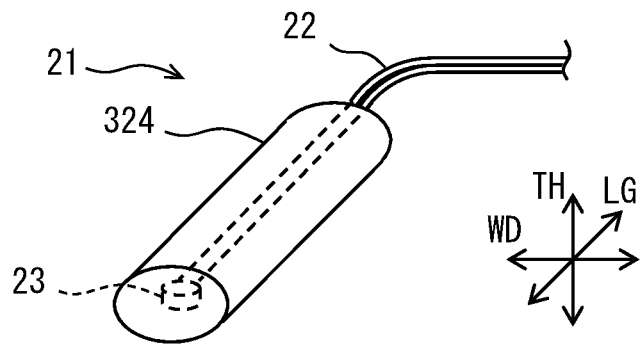
FIG. 12 is a perspective view of the temperature sensor according to a third embodiment.

The present embodiment is a modification in which the preceding embodiment is employed as a base fundamental form. In FIG. 12, the temperature sensor 21 has an elliptically cylindrical inner case 324. The inner case 324 provides a more stable contact state than the inner case 224.

Fourth Embodiment

Figure 13:
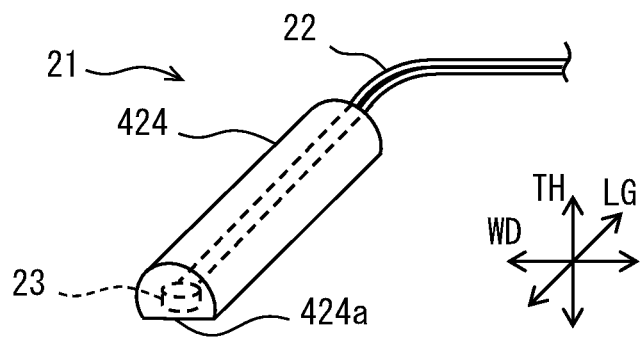
FIG. 13 is a perspective view of the temperature sensor according to a fourth embodiment.

The present embodiment is a modification in which the preceding embodiment is employed as a base fundamental form. In FIG. 13, the temperature sensor 21 has an inner case 424. The inner case 424 has a flat surface 424a facing the installation portion 31. The flat surface 424a provides a stable contact between the temperature sensor 21 and the installation portion 31.

Fifth Embodiment

The present embodiment is a modification in which the preceding embodiment is employed as a base fundamental form. In the above embodiments, the temperature detector 20 is provided on the U-phase wire connection conductor 30u providing the output end. Alternatively, the temperature detector 20 can be provided at a portion reflecting the temperature of the stator coil 12.

Figure 14:
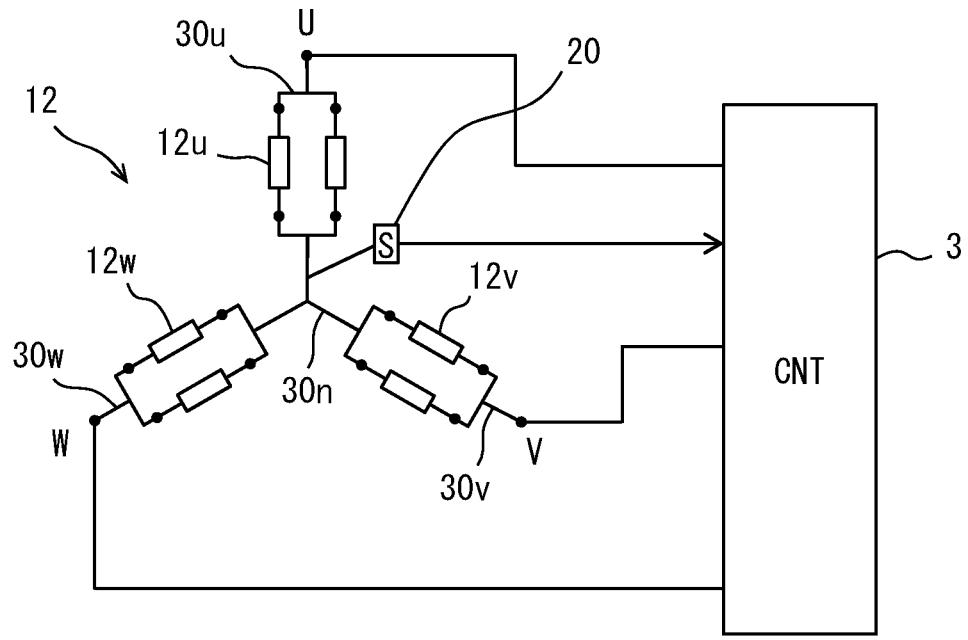
FIG. 14 is a cross-sectional view of the stator coil according to a fifth embodiment.

In FIG. 14, the temperature detector 20 is provided on the neutral point wire connection conductor 30n, and detects temperature of the neutral point wire connection conductor 30n. In the present embodiment, the temperature of the stator coil 12 can also be detected.

Sixth Embodiment

Figure 15:
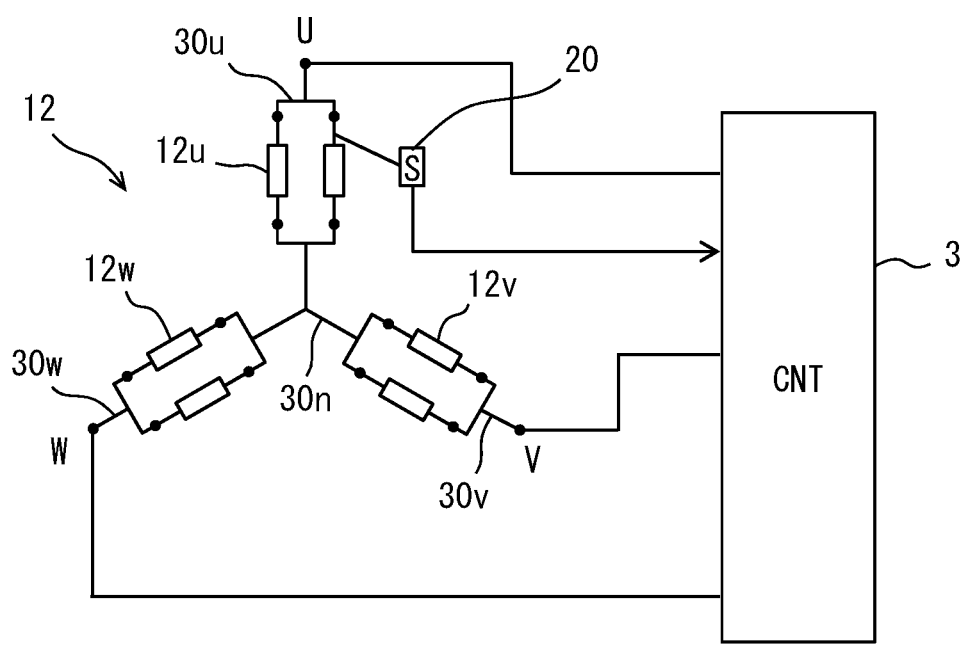
FIG. 15 is a cross-sectional view of the stator coil according to a sixth embodiment.

The present embodiment is a modification in which the preceding embodiment is employed as a base fundamental form. In FIG. 15, the temperature detector 20 is provided on the U-phase coil 12u, and detects the temperature of the U-phase coil 12u. In the present embodiment, the temperature of the stator coil 12 can also be detected.

Other Embodiments

The present disclosure in the specification, the drawings, and the like is not limited to the illustrated embodiments. The present disclosure encompasses the exemplified embodiments and modifications by those skilled in the art based thereon. For example, the present disclosure is not limited to combinations of the parts and/or elements shown in the embodiments. The present disclosure can be implemented in a form of various combinations. The present disclosure may have additional parts that may be added to the embodiments. The present disclosure encompasses omissions of parts and/or elements of the embodiments. The present disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The present disclosure in the specification, the drawings and the like is not limited by the description of the claims. The present disclosure in the specification, the drawings, and the like encompasses the technical ideas described in the claims, and further extends to a wider variety of technical ideas than those in the claims. Therefore, various technical ideas can be extracted from the present disclosure of the specification, the drawings and the like without being limited to the description of the claims.

In the above embodiments, the rotating electric machine 1 serves as a motor generator. Instead, the rotating electric machine 1 may serve as an electric motor. In such a case, the stator coil 12 is also referred to as a field winding. Instead, the rotating electric machine 1 may serve as a generator. In such a case, the stator coil 12 is also referred to as an armature winding.

In the above embodiments, the stator coil 12 has the coil ends 14 and 15 on both ends of the stator core 11. The coil end 14 can be provided in various forms. In one form, the stator coil 12 may be provided by winding a plurality of continuous conductors. In such a case, the coil end 14 is provided as a collection of turns of the continuous conductor. In other forms, the stator coil 12 may be provided as a plurality of segment conductors. In such a case, the coil end 14 is provided as a turn portion of the segment conductor or as a junction joining the plurality of segment conductors. The segment conductor is U-shaped, J-shaped, or I-shaped. The shape of such a coil end is disclosed, for example, in Japanese Patent Laid-Open No. 2000-166150. The present application incorporates the entirety of Japanese Patent Laid-Open No. 2000-166150 by reference. The plurality of segment conductors may be connected by a plurality of connection conductors disposed at the coil end 14. The shape of such a coil end is disclosed, for example, in Japanese Patent Application Laid-Open No. 2018-125924. The present application incorporates the entirety of Japanese Patent Application Laid-Open No. 2018-125924 by reference.

In the above embodiments, one phase is provided by a plurality of phase coils connected in parallel. Alternatively, a series connection may be included in one phase. For example, one phase may be provided by serially connecting two sets of parallel-connected two phase coils.

In the above embodiments, the wire connection conductor 30 has the installation portion 31 in order to dispose/install the temperature sensor 21. Instead, the temperature sensor 21 may be disposed/installed on the wire connection conductor 30 that does not have the installation portion 31.

In the above embodiments, the temperature sensor 21 is inserted into the outer case 25. In addition, a case may be provided further outside the outer case 25.

What is claimed is:

1. A temperature detector for a rotating electric machine comprising:
an installation portion (1) of a first material and (2) that is a part of a wire connector conductor;
a temperature sensor including:
a detector element; and
an inner case of a second material; and
an outer case of a third material, wherein:
the temperature sensor is configured to output an electric signal indicating that a sensed temperature is at or above a predetermined threshold temperature;
the outer case substantially encloses the temperature sensor;
the inner case (1) substantially surrounds the detector element and (2) is stacked on the installation portion in a stacking direction;
a linear expansion coefficient of the outer case in a first temperature range is less than a composite linear expansion coefficient for the detector element and the inner case in the stacking direction when the inner case is stacked on the installation portion;
temperatures in the first temperature range are less than or equal to the threshold temperature; and
the first, second and third materials are different materials.

2. The temperature detector of claim 1, wherein the threshold temperature is a protection temperature for protecting a stator coil of the rotating electric machine.

3. The temperature detector of claim 1, wherein a value of the composite linear expansion coefficient is calculated by: $ALav=(TH31 \times AL31+TH24 \times AL24)/(TH31+TH24)$, wherein:
ALav is the composite linear expansion coefficient,
AL31 is the linear expansion coefficient of the first material used in the installation portion,
AL24 is the linear expansion coefficient of the second material used in the inner case,
TH31 is a thickness of the installation portion in the stacking direction, and
TH24 is a thickness of the inner case in the stacking direction.

4. A rotating electric machine comprising:
a temperature detector, the temperature detector including:
an installation portion (1) of a first material and (2) that is a part of a stator coil of the rotating electric machine;
a temperature sensor including:
a detector element; and
an inner case made of a second material;
an outer case of a third material;
a stator having the stator coil;
a rotor magnetically coupled to the stator; and
a housing for housing the rotor, wherein
the temperature sensor is configured to output an electric signal indicating that a sensed temperature is at or above a predetermined threshold temperature;
the outer case substantially encloses the temperature sensor;
the inner case (1) substantially surrounds the detector element and (2) is stacked on the installation portion in a stacking direction;
a linear expansion coefficient of the outer case in a first temperature range is less than a composite linear expansion coefficient for the detector element and the inner case in the stacking direction when the inner case is stacked on the installation portion;
temperatures in the first temperature range are less than or equal to the threshold temperature; and
the first, second and third materials are different materials.

5. The rotating electric machine of claim 4, further comprising:
a control device configured to determine whether a temperature measured by the temperature sensor is at or above the threshold temperature based on the electric signal.

6. A method of manufacturing a temperature detector for a rotating electric machine comprising steps of:
stacking a temperature sensor, having a detector element that is housed in an inner case of a first material, on an installation portion of a second material and that is part of a stator coil of the rotating electric machine in a stacking direction, wherein the detector element is configured to output an electric signal indicating that a detected temperature is at or above a preset threshold temperature;
molding an outer case of a third material to enclose the installation portion and the temperature sensor by using a mold; and
controlling the temperature of the mold to a target temperature;
wherein, in the stacking direction, a linear expansion coefficient of the third material in a temperature range between the target temperature and the threshold temperature to is smaller than a composite linear expansion coefficient that is based on a linear expansion coefficient of the installation portion in the temperature range and a linear expansion coefficient of the inner case in the temperature range.

7. The method of claim 6, further comprising:
performing a protection control that protects the rotating electric machine when the detected temperature reaches the threshold temperature.

8. The method of claim 6, further comprising the step of:
adjusting the linear expansion coefficient of the third material by adjusting an amount of filler or an amount of resin in the third material before injecting the third material into the mold, and
the composite linear expansion coefficient is calculated by:

$$ALav = (TH31 \times AL31 + TH24 \times AL24)/(TH31 + TH24)$$

wherein:
ALav is the composite linear expansion coefficient,
AL31 is the linear expansion coefficient of the first material used in the installation portion,
AL24 is the linear expansion coefficient of the second material used in the inner case,
TH31 is a thickness of the installation portion in the stacking direction, and
TH24 is a thickness of the inner case in the stacking direction.

* * * * *